United States Patent
Sobue et al.

(10) Patent No.: US 7,508,165 B2
(45) Date of Patent: Mar. 24, 2009

(54) CELL VOLTAGE EQUALIZATION APPARATUS FOR COMBINED BATTERY PACK INCLUDING CIRCUIT DRIVEN BY POWER SUPPLIED BY THE COMBINED BATTERY PACK

(75) Inventors: Satoshi Sobue, Nukata-gun (JP); Tomohisa Yamamoto, Hoi-gun (JP)

(73) Assignee: DENSO Corporation, Karity (JP)

( * ) Notice: Subject to any disclaimer, the term of this patent is extended or adjusted under 35 U.S.C. 154(b) by 225 days.

(21) Appl. No.: 11/231,846

(22) Filed: Sep. 22, 2005

(65) Prior Publication Data

US 2006/0082343 A1    Apr. 20, 2006

(30) Foreign Application Priority Data

Oct. 19, 2004  (JP) .............................. 2004-304275
Oct. 19, 2004  (JP) .............................. 2004-304276

(51) Int. Cl.
*H02J 7/00*  (2006.01)

(52) U.S. Cl. ..................... 320/118; 320/104; 320/112; 320/119; 320/136; 320/166

(58) Field of Classification Search ................ 320/104, 320/112, 118, 119, 120, 136, 166; 307/10.1
See application file for complete search history.

(56) References Cited

U.S. PATENT DOCUMENTS

| | | | | |
|---|---|---|---|---|
| 3,978,391 A | * | 8/1976 | Migeon et al. | 323/281 |
| 4,685,039 A | * | 8/1987 | Inou et al. | 363/16 |
| 5,886,502 A | * | 3/1999 | Higashijima | 320/118 |
| 5,907,238 A | * | 5/1999 | Owerko et al. | 323/349 |
| 5,959,437 A | * | 9/1999 | Hamaguchi | 320/134 |
| 5,998,969 A | * | 12/1999 | Tsuji et al. | 320/132 |
| 6,034,507 A | * | 3/2000 | Ikawa et al. | 320/136 |
| 6,075,729 A | * | 6/2000 | Ohhata et al. | 365/190 |
| 6,133,707 A | * | 10/2000 | Kikuchi et al. | 320/104 |

(Continued)

FOREIGN PATENT DOCUMENTS

JP    A-11-239050    8/1999

(Continued)

OTHER PUBLICATIONS

Notice of Rejection dated Dec. 21, 2007 in corresponding Japanese Patent Application No. 2004-304275 (and English translation).

(Continued)

*Primary Examiner*—Akm E Ullah
*Assistant Examiner*—Arun Williams
(74) *Attorney, Agent, or Firm*—Posz Law Group, PLC

(57) ABSTRACT

In a combined battery pack of a plurality of battery cells, a comparison circuit compares a voltage appearing at a common connection point between two adjacent battery cells with a reference voltage. Based on a result of the comparison, an electric discharging operation of an electric discharging circuit connected between both terminals of each of the battery cells is carried out. The comparison circuit is driven to operate with a power supply voltage appearing between a positive-side terminal of a battery cell provided on a higher-potential side of a common connection point and the negative-side terminal of the battery cell provided on a lower-potential side of the common connection point.

11 Claims, 4 Drawing Sheets

U.S. PATENT DOCUMENTS

| | | | |
|---|---|---|---|
| 6,181,108 B1 * | 1/2001 | Sudo et al. | 320/134 |
| 6,291,972 B1 * | 9/2001 | Zhang | 320/118 |
| 6,294,899 B1 * | 9/2001 | Tokugawa et al. | 322/28 |
| 6,377,024 B1 * | 4/2002 | Choy | 320/118 |
| 6,384,584 B2 * | 5/2002 | Sugano | 323/282 |
| 6,430,066 B2 | 8/2002 | Emori et al. | |
| 6,492,791 B1 * | 12/2002 | Saeki et al. | 320/135 |
| 6,677,732 B1 * | 1/2004 | Inoue et al. | 320/166 |
| 2001/0052759 A1 * | 12/2001 | Sakurai et al. | 320/134 |
| 2001/0054880 A1 * | 12/2001 | Haraguchi et al. | 320/134 |
| 2003/0044689 A1 * | 3/2003 | Miyazaki et al. | 429/320 |
| 2005/0001671 A1 * | 1/2005 | Nakata | 327/539 |
| 2005/0024015 A1 * | 2/2005 | Houldsworth et al. | 320/119 |
| 2005/0068008 A1 * | 3/2005 | Zhang | 320/134 |
| 2005/0073282 A1 * | 4/2005 | Carrier et al. | 320/106 |
| 2005/0140335 A1 * | 6/2005 | Lee et al. | 320/118 |
| 2005/0269990 A1 * | 12/2005 | Yudahira | 320/119 |
| 2006/0044709 A1 * | 3/2006 | Seiersen | 361/18 |

FOREIGN PATENT DOCUMENTS

| | | |
|---|---|---|
| JP | A-2000-287370 | 10/2000 |
| JP | A-2001-308659 | 11/2001 |
| JP | A-2004-80909 | 3/2004 |
| JP | A-2004-248348 | 9/2004 |

OTHER PUBLICATIONS

Notice of Rejection dated Dec. 21, 2007 in corresponding Japanese Patent Application No. 2004-304276 (and English translation).

* cited by examiner

CELL VOLTAGE EQUALIZATION APPARATUS FOR COMBINED BATTERY PACK INCLUDING CIRCUIT DRIVEN BY POWER SUPPLIED BY THE COMBINED BATTERY PACK

CROSS REFERENCE TO RELATED APPLICATION

This application is based on and incorporates herein by reference Japanese Patent Applications No. 2004-304275 and No. 2004-304276, both being filed on Oct. 19, 2004.

FIELD OF THE INVENTION

The present invention relates to a cell voltage equalization apparatus provided for a combined battery pack, which includes a plurality of cells of secondary batteries connected to each other in series, for making the voltages of the cells uniform in the combined battery pack.

BACKGROUND OF THE INVENTION

An electric vehicle (EV) and a hybrid electric vehicle (HV) require a high voltage in the range of about 100V to 400V. These vehicles use therefore a combined battery pack that includes the cells of a large number of secondary batteries connected to each other in series. In the case of a combined battery pack having a voltage of 300V, for example, it is necessary to connect the cells of 150 lead batteries each having a voltage of 2V/cell in series, the cells of 250 nickel hydrogen batteries each having a voltage of 1.2V/cell in series or the cells of 80 lithium ion batteries each having a voltage of 3.6V/cell. The lithium ion battery has a characteristic superior to the lead battery and the nickel hydrogen battery in respect of volume energy density, weight energy density and cycle life.

The secondary battery such as the lithium ion battery in particular does not endure excessive charging and excessive discharging. Therefore, the amount of electric charge accumulated in the battery decreases substantially and heat is dissipated considerably, unless the battery is used within a limited voltage range. Thus, to use a combined battery pack, constant-voltage electric-charging control needs be executed to put the voltage appearing between the terminals of the combined battery pack within a voltage range determined by an upper-limit voltage and a lower-limit voltage. In addition, a protection circuit is also required to prevent the voltage appearing between the terminals of the combined battery pack from exceeding the limited voltage range.

Moreover, the combined battery pack has cell voltage dispersions caused by SOC (state of charge) dispersions among cells composing the combined battery pack. In the combined battery pack, the cell SOC and, hence, the cell voltage vary from cell to cell due to the fact that there are differences in storage capacity and differences in self electric discharging characteristic among the cells. In particular, since the lithium ion battery has a very poor characteristic of enduring excessive electric charging and excessive electric discharging in comparison with other types of secondary batteries, variations in SOC from cell to cell may become even worse. In this case, the combined battery pack will not be usable at all.

To solve the above drawbacks, JP 2004-080909A proposes that, when variations exceeding a predetermined level are detected while the vehicle is traveling, the amount of residual electric charge left or available in the combined battery pack is adjusted by electrically charging or discharging each battery cell to a target residual electric-charge amount set for a stop state of the vehicle. It also proposes that, when there is a battery cell with its inter-terminal voltage exceeding a uniform reference voltage in a stop state of the vehicle, electric charge accumulated in the battery cell is discharged so that the voltage appearing between the terminals of each battery cell is made equal to the uniform reference voltage.

In addition, JP2004-248348A proposes that, when a voltage generated by a secondary battery being subjected to an electric discharging process decreases abnormally, an electric discharging switch employed in an electric discharging circuit is turned off forcibly to avoid an excessive electric discharging of the secondary battery.

FIG. 4 shows a comparator employed in a conventional cell voltage equalization apparatus provided for a combined battery pack 1. The combined battery pack 1 has battery cells BC1, - - -, BCn-1, BCn and BCn+1, which are connected to each other in series. On the other hand, a reference voltage generation circuit 2 has a configuration comprising resistors R1, - - -, Rn-1, Rn, Rn+1 and Rn+2, which are connected to each other to form a series circuit. A n-th comparator CPn compares the voltage Vn+1 appearing at the negative-side terminal of a battery cell BCn with a divided voltage VRn+1 generated by the reference voltage generation circuit 2 as a reference voltage. Similarly, a comparator CPn-1 (not shown) compares the voltage Vn appearing at the positive-side terminal of the battery cell BCn with a divided voltage VRn also generated by the reference voltage generation circuit 2 as another reference voltage. An electric discharging process of the battery cell BCn is controlled based on a signal output by the comparator CPn and a signal output by the comparator CPn-1.

The comparator CPn includes PNP-type differential amplifier transistors Q1 to Q4. The base of the transistor Q1 is connected to the negative-side terminal of the battery cell BCn. The voltage Vn+1 appears at the negative-side terminal of the battery cell BCn. The base of the transistor Q2 is connected to the point of junction between the resistors Rn and Rn+1. The divided voltage VRn+1 generated by the reference voltage generation circuit 2 appears at this point of junction. When the voltage Vn+1 becomes higher than the reference voltage VRn+1 by a difference at least equal to a forward-direction voltage Vf, the pn junction between the collector and base of the transistor Q4 is biased in the forward direction, causing the transistor Q4 to terminate an amplifying operation. Thus, when the degree of non-uniformity of cell voltages increases in the cell voltage equalization apparatus, the comparators do not operate normally, making it impossible to execute normal control of the cell voltage equalization process.

SUMMARY OF THE INVENTION

It is thus a first object of the present invention to provide a cell voltage equalization apparatus capable of carrying out a cell voltage equalization operation even when the degree of non-uniformity of cell voltages increases.

In accordance with a first aspect of the present invention, a voltage appearing at both terminals of each of battery cells composing a combined battery pack is not compared directly with a reference voltage, but a voltage appearing at a common connection point between every two adjacent ones of the battery cells is compared with a reference voltage generated for the voltage. Based on a result of the comparison, an electric discharging operation of an electric discharging circuit connected between both terminals of each of the battery cells is carried out.

In this case, a comparison circuit for comparing the voltages is driven to operate with a power supply voltage appearing between a positive-side terminal of a battery cell provided on a higher-potential side of a common connection point and the negative-side terminal of the battery cell provided on a lower-potential side of the common connection point, which is a point of connection between the battery cells provided on the higher-potential and lower-potential sides. That is, the power supply voltage fed to a control circuit is supplied from terminals of two or more battery cells connected in series to sandwich the common connection point located between the battery cells as a point, a voltage appearing at which is to be compared with the reference voltage. Thus, the power supply voltage fed to the control circuit can be extended to the lower-potential side, higher-potential side or both the lower-potential and higher-potential sides relative to the voltage between terminals of one cell.

Therefore, even when SOC dispersions in the combined battery charge are large and the voltage appearing at the common connection point as a voltage being compared with the reference voltage corresponding to the voltage is lower or higher than the reference voltage as indicated by a comparison circuit comprising differential input NPN transistors, the comparison circuit is capable of carrying out the comparison operation normally. The cell voltage equalization apparatus is thus capable of carrying out the cell voltage equalization operation normally as long as the reference voltage is approximately within the extended range of the power supply voltage.

It is a second object of the present invention to provide a signal transfer circuit for a combined battery pack driven to operate with a power supply voltage generated by the combined battery pack and capable of drastically reducing an effect of dispersions in voltage among battery cells composing the combined battery pack and other effects on the combined battery pack.

In accordance with a second aspect of the present invention, a first transistor receiving a signal operates in a state of being connected to a ground, which is the negative-side terminal of a second battery cell employed in the combined battery pack. On the other hand, a second transistor outputting a signal operates in a state of being connected to the ground, which is an inter-cell connection point existing between the positive-side terminal of a first battery cell and the negative-side terminal of the second battery cell in the combined battery pack. Such an inter-cell connection point is a common connection point. In the series connection of the battery cells, the second battery cell is placed on a side of an electrical potential lower than the first battery cell.

When a signal set at the L level is input or when the voltage of the input signal is approximately equal to the voltage of the negative-side terminal of the second battery cell, the first transistor is turned off. In this state, a current flows from a constant current circuit connected to the positive-side terminal of the first battery cell to the common connection point by way of a diode for preventing the current from flowing in reverse and a resistor. Due to a voltage drop along the resistor, the second transistor is turned on, pulling down the output signal to the L level, which is the electric-potential level of the common connection point.

When a signal set at the H level is input or when the voltage of the input signal is higher than the voltage of the negative-side terminal of the second battery cell by a forward-direction voltage, on the other hand, the first transistor is turned on. In this state, the collector of the first transistor is pulled down to an electric-potential level approximately equal to the level of the voltage of the negative-side terminal of the second battery cell. Since the diode for preventing a current from flowing in the reversed direction is connected between the collector of the first transistor and the base of the second transistor, however, a difference between a voltage appearing at the common connection point and a voltage appearing at the negative-side terminal of the second transistor is applied to the diode. Thus, a junction between the base and emitter of the second transistor is protected against an over voltage.

In accordance with the signal transfer circuit, a current consumed by the signal transfer circuit has an all but constant magnitude approximately equal to the current generated by the constant current circuit even when a cell voltage appearing between the positive-side terminal of the first battery cell and the negative-side terminal of the second battery cell changes or even when the level of the input signal varies. That is, the magnitude of the current consumed by the signal transfer circuit is all but constant without regard to whether the level of the input signal is an L or H level.

In addition, since the current consumed by the signal transfer circuit needs be just enough for carrying out the operation to carry out the level-shifting operation, the magnitude of the consumed current can be reduced to a very small value. Even though the current consumed by the signal transfer circuit is originally generated by the combined battery pack, the magnitude of the consumed current can be reduced to a very small value. Thus, the effect of the consumed current on the combined battery pack can be decreased dramatically. An example of the effect of the consumed current on the combined battery pack is generation of a state in which voltages generated by the battery cells are not uniform.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
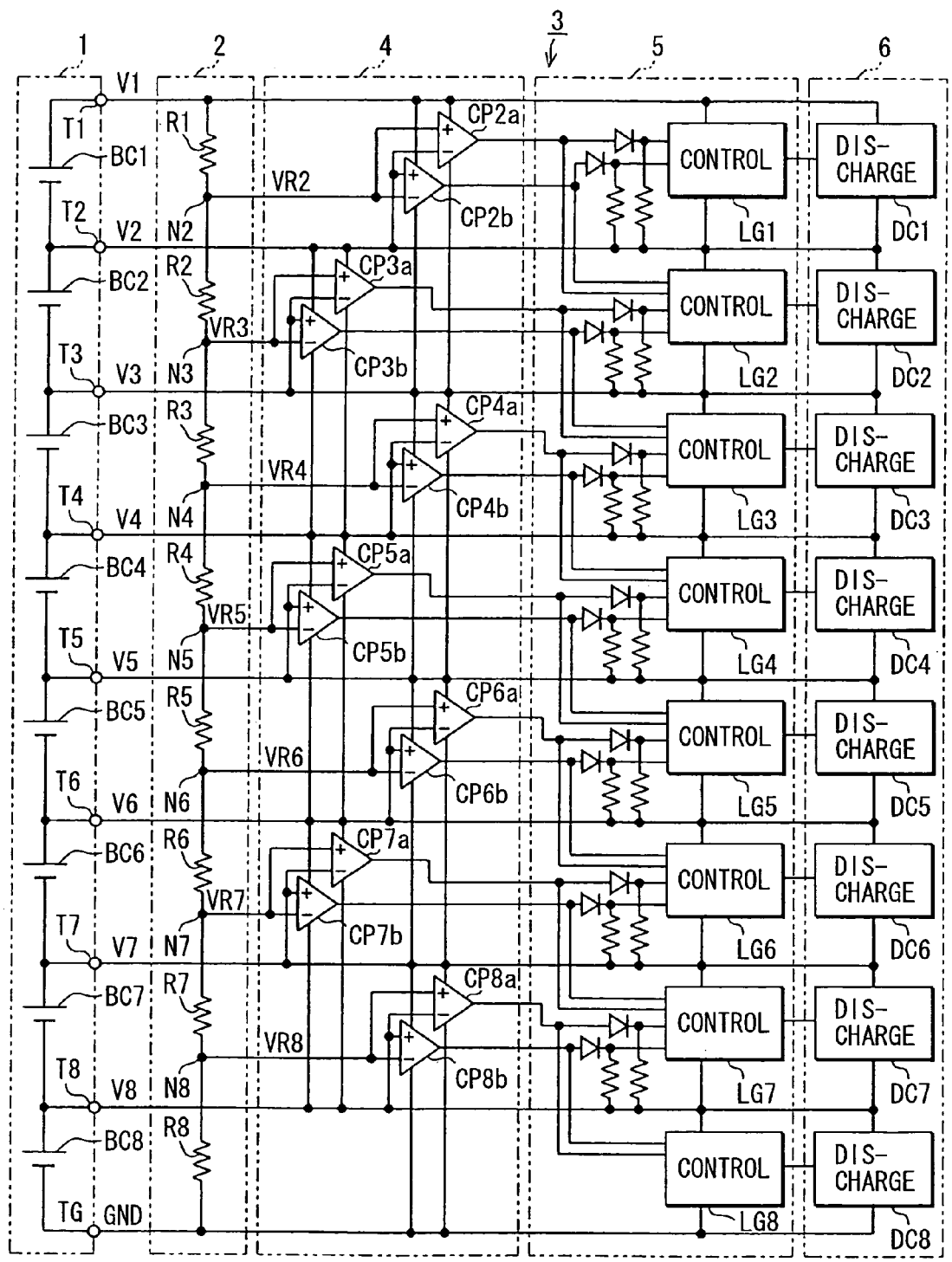
FIG. 1 is a circuit diagram showing a combined battery pack and a cell voltage equalization circuit unit according to a first embodiment of the present invention.

Referring first to FIG. 1, a combined battery pack 1 is employed in an electric vehicle (EV) or a hybrid electric vehicle (HV). Typically, the combined battery pack 1 comprises cells of lithium-ion batteries. The combined battery pack 1 includes a plurality of cell groups connected to each other in series. Each of the cell group includes typically eight battery cells BC1 to BC8 connected to each other in series. In the combined battery pack 1, a terminal T1 is a positive-side terminal of a battery cell BC1. On the other hand, a terminal T2 is a negative-side terminal of the battery cell BC1 as well as a positive-side terminal of a battery cell BC2. Similarly, the combined battery pack 1 also includes terminals T3, T4, T5, T6 and T7 similar to the terminal T2. Lastly, in the case of a cell group including eight battery cells BC1 to BC8, a terminal T8 is a negative-side terminal of the battery cell BC7 as well as a positive-side terminal of a battery cell BC8. A terminal TG is a negative-side terminal of the battery cell BC8.

An equalization circuit unit 3 for the combined battery pack 1 is a circuit for executing electric discharging control to make the voltages generated by the battery cells BC1 to BC8 uniform and equal to the lowest voltage among the battery cells BC1 to BC8 when an IG switch (ignition switch including a main power supply switch) of the vehicle is turned off, that is, when the vehicle operation is stopped. The IG switch is put in a turned-off state during a period (for example at night) when the vehicle is not operated. By execution of the electric discharging control, dispersions in the state of charge (SOC) among the battery cells BC1 to BC8 can be eliminated.

The equalization circuit unit 3 comprises a reference voltage generation circuit 2, a comparison circuit 4, an electric discharging control circuit 5 and an electric discharging circuit 6. The equalization circuit unit 3 is integrated in a one-chip IC along with an over-charge/over-discharge detection circuit for detecting an excessive electrically charged condition and an excessive electrically discharged condition, which exist when the IG switch of the vehicle is in a turned-on state.

The reference voltage generation circuit 2 includes 8 resistors R1 to R8 connected in series to each other to form a series circuit between the terminals T1 and TG. A reference voltage VR2 is generated at a connection node N2 between the resistors R1 and R2. Similarly, a reference voltage VR3 is generated at a connection node N3 between the resistors R2 and R3. In the same way, other reference voltages VR are generated at corresponding connection nodes N between corresponding two adjacent resistors R. Lastly, in the case of a cell group including eight battery cells BC1 to BC8, a reference voltage VR8 is generated at a connection node N8 between the resistors R7 and R8. Each of the reference voltages VR is generated at a connection node N corresponding to the reference voltage VR at an electric-potential level equal to that of a voltage, which appears at the connection node N in a state in which the battery cells BC1 to BC8 have uniform voltages. All the battery cells BC1 to BC8 have the same specifications and the resistances of all the resistors R1 to R8 are set to the same value.

The comparison circuit 4 includes comparators CP2*a* and CP2*b* for comparing a voltage V2 appearing at the terminal T2 with the reference voltage VR2 appearing at the connection node N2. Similarly, the comparison circuit 4 also includes comparators CP3*a* and CP3*b* for comparing a voltage V3 appearing at the terminal T3 with the reference voltage VR3 appearing at the connection node N3. In the same way, the comparison circuit 4 includes other comparators each used for comparing a voltage appearing at a corresponding terminal with the reference voltage appearing at a corresponding connection node associated with the corresponding terminal. Lastly, in the case of a cell group including eight battery cells BC1 to BC8, the comparison circuit 4 includes comparators CP8*a* and CP8*b* for comparing a voltage V8 appearing at the terminal T8 with the reference voltage VR8 appearing at the connection node N8.

Typically, the comparators CP2*a* and CP2*b* are driven to operate with a power supply voltage equal to a voltage generated by two battery cells connected to each other in series as battery cells associated with the comparators CP2*a* and CP2*b*. More specifically, the power supply voltage is a voltage appearing between the positive-side terminal T1 of the battery cell BC1 placed on the high-potential side of the terminal T2, the voltage V2 appearing at which is to be compared with the reference voltage VR2 appearing at the connection node N2, and the negative-side terminal T3 of the battery cell BC2 placed on the low-potential side of the terminal T2. The non-inverting input terminal and inverting input terminal of the comparator CP2*a* are connected to the connection node N2 and the terminal T2 respectively. Conversely, the inverting input terminal and non-inverting input terminal of the comparator CP2*b* are connected to the connection node N2 and the terminal T2 respectively.

The comparators CP2*a* and CP2*b* each operate as a window comparator based on an input offset voltage as will be described later. The configuration for supplying a power supply voltage to the comparators CP2*a* and CP2*b*, the connections of the comparators CP2*a* and CP2*b* and the operations carried out by the comparators CP2*a* and CP2*b* hold true of the comparators CP3*a* and CP3*b*, the comparators CP4*a* and CP4*b*, - - - as well as the comparators CP8*a* and CP8*b*.

Figure 2:
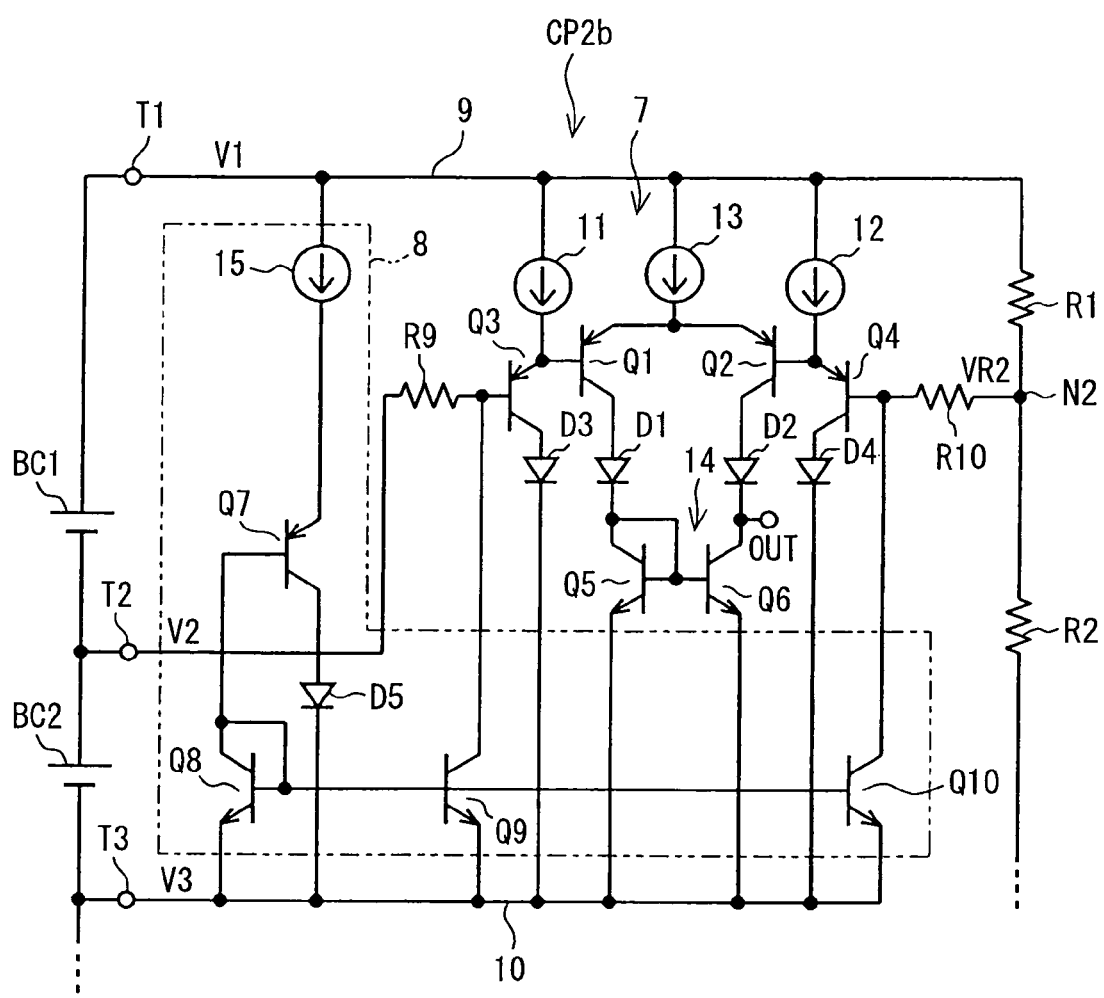
FIG. 2 is a circuit diagram showing a comparator employed in the first embodiment.

Each comparator CP2*a* to CP8*b* is constructed in the same manner. As one example, the comparator CP2*b* is described in detail with reference to FIG. 2.

The comparator CP2*b* has differential pairs 7 including PNP-type differential input transistors Q1 to Q4 and a base current compensation circuit 8 for supplying a base current to the transistors Q1 and Q2. The base of the transistor Q3 in the differential pairs 7 is connected to the terminal T2 through a resistor R9. The base of the transistor Q4 is connected to the connection node N2 through a resistor R10. The emitters of the transistors Q3 and Q4 are connected to a power supply line 9 through constant current circuits 11 and 12 respectively. The power supply line 9 connects the constant current circuits 11 and 12 to the terminal T1. The emitters of the transistors Q1 and Q2, which are connected to each other, are connected to the power supply line 9 through a constant current circuit 13. The differential input transistors Q1 to Q4 are deliberately configured at two stages to reduce the magnitudes of input bias currents.

A power supply line 10 connected to the terminal T3 is connected to an active load circuit 14 (corresponding to a load circuit). The active load circuit 14 includes transistors Q5 and Q6. The differential input transistors Q1 and Q2 are connected to the active load circuit 14 through diodes D1 and D2 respectively. The diodes D1 and D2 are each used for preventing a current from flowing in reverse. Similarly, the differential input transistors Q3 and Q4 are connected to the power supply line 10 through diodes D3 and D4 respectively. The diodes D3 and D4 are also each used for preventing a current from flowing in reverse.

The base current compensation circuit 8 is provided as a circuit for further reducing an input bias current. In the base current compensation circuit 8, a constant current circuit 15, a transistor Q7 and a diode D5 are connected to each other to form a series circuit between the power supply lines 9 and 10. A transistor Q8 is connected between the base of the transistor Q7 and the power supply line 10. A transistor Q9 is connected between the base of the transistor Q3 and the power supply line 10. A transistor Q10 is connected between the base of the transistor Q4 and the power supply line 10. The transistors Q9 and Q10 form a current mirror circuit in conjunction with the transistor Q8.

Referring to FIG. 1 again, the electric discharging control circuit 5 further includes logic circuits LG1 to LG8 and outputs an electric discharging control signal to a electric discharging circuit 6 based on a signal output by the comparison circuit 4. The electric discharging circuit 6 comprises an electric discharging circuit DC1 connected between the terminals of the battery cell BC1, an electric discharging circuit DC2 connected between the terminals of the battery cell BC2 - - - and an electric discharging circuit DC8 connected between the terminals of the battery cell BC8. The electric discharging circuits DC1 to DC8 are each a switch circuit typically having a transistor used as an electric discharging path.

An electric discharging control signal generated by the electric discharging control circuit 5 turns on and off the above transistor serving as the electric discharging path. In an electric discharging state, a constant current, a current determined by a cell voltage or a current proportional to the cell voltage flows.

In operation, while the combined battery pack 1 is in use, the combined battery pack 1 carries out electric charging and discharging operations repeatedly. As the electric charging and discharging operations are carried out repeatedly, the SOC of the battery cells BC1 to BC8 disperse due to, among others, variations in storage capacity among the battery cells BC1 to BC8 and variations in self electric discharging characteristic among the battery cells BC1 to BC8. As a result, the voltages generated by the battery cells BC1 to BC8 become no longer uniform. With the IG switch of the vehicle put in a turned-off state, however, the equalization circuit unit 3 carries out an equalization process to make cell voltages uniform as follows.

(1) Control of the Electric Discharging Circuit DC1

When the voltage V2 appearing at the terminal T2 becomes lower than the reference voltage VR2 appearing at the connection node N2 by a difference at least equal to an offset voltage Voffset, the comparator CP2a changes its signal output thereby from the L level to a H level. When the voltage V2 appearing at the terminal T2 becomes higher than the reference voltage VR2 appearing at the connection node N2 by a difference at least equal to an offset voltage Voffset, on the other hand, the comparator CP2b changes its signal output thereby from the L level to the H level. The L level of the comparators CP2a and CP2b is the level of the voltage V3 appearing at the terminal T3 whereas their H level is the level of the voltage V1 appearing at the terminal T1.

The comparators CP2a and CP2b are driven to operate by the power supply voltage appearing between the terminals T1 and T3. At the terminal T1, an electric potential appears as an electric potential higher than the voltage V2, which appears at the terminal T2 as a voltage being compared, by a difference equal to the voltage appearing between the terminals of the battery cell BC1. At the terminal T3, on the other hand, an electric potential appears as an electric potential lower than the voltage V2 by a difference equal to the voltage appearing between the terminals of the battery cell BC2. Thus, when the reference voltage VR2 is lower than a voltage of (V1−2×Vf) but higher than the voltage V3, the comparison operations can be carried out normally.

As a result, when a signal output by the comparator CP2a is set at the H level while a signal output by the comparator CP2b is set at the L level, the voltage V2 appearing at the terminal T2 can be assumed to be in a first state. In the first state, the voltage V2 appearing at the terminal T2 is lower than the reference voltage VR2 appearing at the connection node N2 by a difference at least equal to the offset voltage Voffset.

When the signal output by the comparator CP2a is set at the L level while the signal output by the comparator CP2b is set at the H level, on the other hand, the voltage V2 appearing at the terminal T2 can be assumed to be in a second state. In the second state, the voltage V2 appearing at the terminal T2 is higher than the reference voltage VR2 appearing at the connection node N2 by a difference at least equal to the offset voltage Voffset.

When the signals output by the comparators CP2a and CP2b are both set at the L level, the voltage V2 appearing at the terminal T2 can be assumed to be in a third state. In the third state, the difference between the voltage V2 appearing at the terminal T2 and the reference voltage VR2 appearing at the connection node N2 is smaller than the offset voltage Voffset, that is, the voltage V2 appearing at the terminal T2 has a level approximately equal to the level of the reference voltage VR2 appearing at the connection node N2.

In the first state, the voltage appearing between the terminals of the battery cell BC1 is higher than a uniform cell voltage, which is a cell voltage in a state of uniform cell voltages. Thus, the logic circuit LG1 outputs an electric discharging control signal to the electric discharging circuit DC1 as a request for an activation of an electric discharging process. In the second or third state, on the other hand, the voltage appearing between the terminals of the battery cell BC1 is lower than or approximately equal to the uniform cell voltage. Thus, the logic circuit LG1 outputs an electric discharging control signal to the electric discharging circuit DC1 as a request for a termination of an electric discharging process.

(2) Control of the Electric Discharging Circuit DC2

Much like the comparators CP2a and CP2b, the comparators CP3a and CP3b are capable of carrying out operations to compare the voltage V3 with the reference voltage VR3 without regard to whether the voltage V3 is higher or lower than the reference voltage VR3. Similarly, when a signal output by the comparator CP3a is set at the H level while a signal output by the comparator CP3b is set at the L level, the voltage V3 appearing at the terminal T3 can be assumed to be in a first state. In the first state, the voltage V3 appearing at the terminal T3 is lower than the reference voltage VR3 appearing at the connection node N3 by a difference at least equal to the offset voltage Voffset.

When the signal output by the comparator CP3a is set at the L level while the signal output by the comparator CP3b is set at the H level, on the other hand, the voltage V3 appearing at the terminal T3 can be assumed to be in a second state. In the second state, the voltage V3 appearing at the terminal T3 is higher than the reference voltage VR3 appearing at the connection node N3 by a difference at least equal to the offset voltage Voffset.

When the signals output by the comparators CP3a and CP3b are both set at the L level, the voltage V3 appearing at the terminal T3 can be assumed to be in a third state. In the third state, the difference between the voltage V3 appearing at the terminal T3 and the reference voltage VR3 appearing at the connection node N3 is smaller than the offset voltage Voffset, that is, the voltage V3 appearing at the terminal T3 is at a level approximately equal to the level of the reference voltage VR3 appearing at the connection node N3.

When the voltage V2 is higher than the reference voltage VR2 by a difference at least equal to the offset voltage Voffset, that is, when the voltage V2 is in the second state, while the voltage V3 is lower than the reference voltage VR3 by a difference at least equal to the offset voltage Voffset or approximately equal to the reference voltage VR3, that is, while the voltage V3 is in the first or third state, or when the voltage V2 is approximately equal to the reference voltage VR2, that is, when the voltage V2 is in the third state, while the voltage V3 is lower than the reference voltage VR3 by a difference at least equal to the offset voltage Voffset, that is, while the voltage V3 is in the first state, the voltage appearing between the terminals of the battery cell BC2 can be assumed to be higher than the uniform cell voltage. Thus, in these cases, the logic circuit LG2 outputs an electric discharging control signal to the electric discharging circuit DC2 as a request for an activation of an electric discharging process.

In cases other than the above cases, on the other hand, the voltage appearing between the terminals of the battery cell BC2 can be assumed to be lower than or approximately equal to the uniform cell voltage. Thus, in these other cases, the logic circuit LG2 outputs an electric discharging control signal to the electric discharging circuit DC2 as a request for a termination of an electric discharging process. Control of the electric discharging circuits DC3 to DC7 associated with the battery cells BC3 to BC7 respectively is executed in the same way as the control described above as the control of the electric discharging circuit DC2 associated with the battery cell BC2.

(3) Control of the Electric Discharging Circuit DC8

When the voltage V8 is higher than the reference voltage VR8 by a difference at least equal to the offset voltage Voffset, that is, when the voltage V8 is in the second state, the voltage appearing between the terminals of the battery cell BC8 can be assumed to be higher than the uniform cell voltage. Thus, in this case, the logic circuit LG8 outputs an electric discharging control signal to the electric discharging circuit DC8 as a request for an activation of an electric discharging process. When the voltage V8 is lower than the reference voltage VR8 by a difference at least equal to the offset voltage Voffset, that is, when the voltage V8 is in the first state, the voltage appearing between the terminals of the battery cell BC8 can be assumed to be lower than the uniform cell voltage, or when the voltage V8 is approximately equal to the reference voltage VR8, that is, when the voltage V8 is in the third state, the voltage appearing between the terminals of the battery cell BC8 can be approximately equal to the uniform cell voltage. Thus, in this case, the logic circuit LG8 outputs an electric discharging control signal to the electric discharging circuit DC8 as a request for a termination of an electric discharging process.

By execution of the electric discharging control described above, the voltages of the battery cells BC1 to BC8 are brought to the lowest one among the battery cells BC1 to BC8 so that dispersions of the SOC of the battery cells BC1 to BC8 can be eliminated.

In accordance with the first embodiment implementing the combined battery pack 1, the comparators CPna and CPnb (where n=2 to 8) each used for comparing a voltage Vn appearing at a common connection terminal Tn with a reference voltage VRn are driven to operate by a power supply voltage appearing between the positive-side terminal of the battery cell BCn−1 provided on the high-potential side of the common connection terminal Tn and the negative-side terminal of the battery cell BCn provided on the low-potential side of the common connection terminal Tn. Thus, even in a state of unequal cell voltages, the comparators CPna and CPnb are each capable of carrying out a comparison normally without regard to whether the voltage Vn is higher or lower than the reference voltage VRn.

Since each of the comparators CPna and CPnb (where n=2 to 8) has differential input transistors Q1 and Q3 as well as Q2 and Q4, which are deliberately configured at two stages, and a base current compensation circuit 8, the input bias currents are small. Thus, the magnitude of each current flowing into the reference voltage generation circuit 2 is small, making it possible to prevent shifts of the reference voltages VR2 to VR8 from being generated.

In addition, each of the comparators CPna and CPnb (where n=2 to 8) employs diodes D1 to D5 each used for preventing a current from flowing in the reversed direction. Thus, the magnitude of a current flowing to the base current compensation circuit 8 by way of the comparators CPna and CPnb can be reduced even when a reference voltage VRn decreases to a level below the voltage Vn+1 appearing at the terminal Tn+1 in a state wherein the voltages of the battery cells BC1 to BC8 employed in the combined battery pack 1 are far from being uniform. Thus, shifts of the reference voltages VR2 to VR8 can be prevented from being generated.

Since the comparison circuit 4 employs a window comparator comprising a pair of comparators CPna and CPnb (where n=2 to 8), the voltage Vn can be compared with the reference voltage VRn to determine which voltage is higher or lower than the other even when the voltage Vn is approximately equal to the reference voltage VRn. In addition, since the electric discharging control circuit 5 generates an electric discharging control signal based on a signal output by the comparison circuit 4, it is possible to avoid an electric discharging operation not necessary for a case in which the voltages of the battery cells BCn (where n=1 to 8) are approximately equal to the uniform cell voltage mentioned before.

In the first embodiment, the input offset voltage of the comparators CPna (where n=2 to 8) can be set at 0 and the comparators CPnb (where n=2 to 8) can thus be eliminated. In this case, the electric discharging control circuit 5 executes the electric discharging control by assuming that the above third state does not exist. For example, in the electric discharging control of the battery cell BC2, when the voltage V2 is higher than the reference voltage VR2 and the voltage V3 is lower than the reference voltage VR3, the logic circuit LG2 outputs an electric discharging control signal to the electric discharging circuit DC2 as a request for an activation of an electric discharging process. In other cases, the logic circuit LG2 outputs an electric discharging control signal to the electric discharging circuit DC2 as a request for a termination of an electric discharging process.

Second Embodiment

Figure 3:
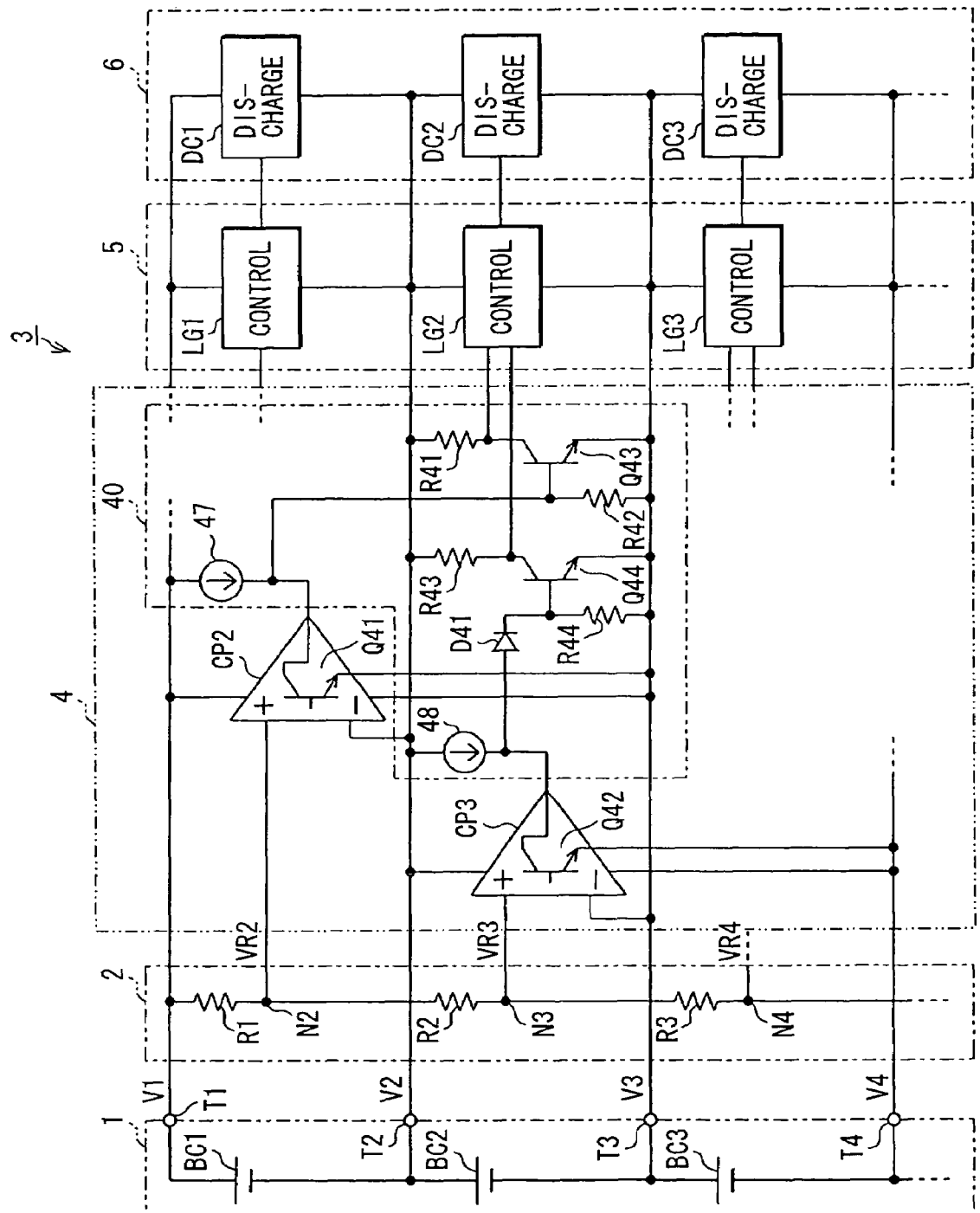
FIG. 3 is a circuit diagram showing a combined battery pack and a cell voltage equalization circuit unit according to a second embodiment of the present invention.
Figure 4:
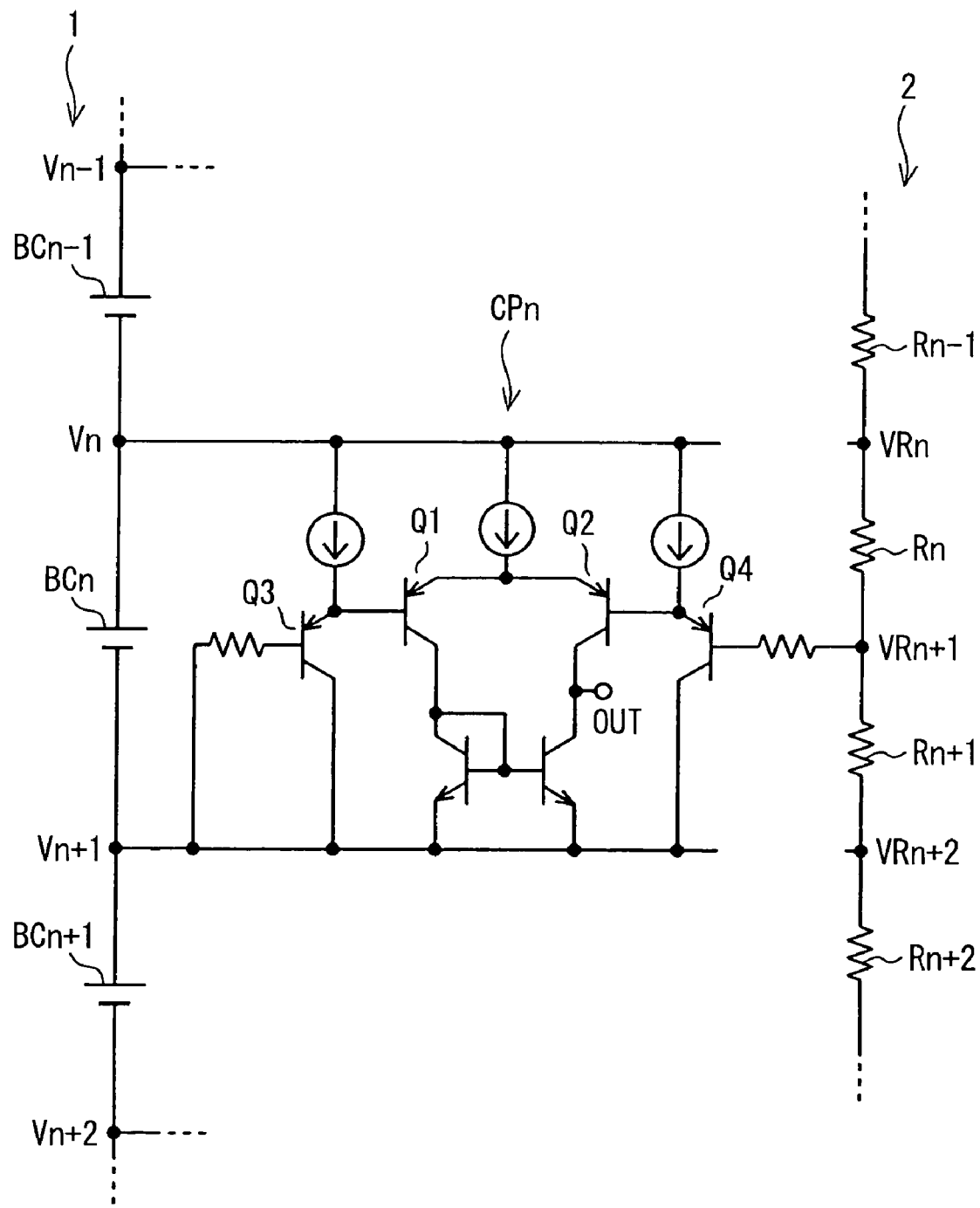
FIG. 4 is a circuit diagram showing a comparator employed in a conventional cell voltage equalization apparatus.

As shown in FIG. 3, a combined battery pack 1 includes a plurality of cell groups connected to each other in series. Each of the cell group includes typically eight battery cells BC1 to BC8 connected to each other in series. In the combined battery pack 1, a terminal T1 is a positive-side terminal of a battery cell BC1. On the other hand, a terminal T2 is a negative-side terminal of the battery cell BC1 as well as the positive-side terminal of a battery cell BC2. Similarly, a terminal T3 is a negative-side terminal of the battery cell BC2 as well as a positive-side terminal of a battery cell BC3. In the same way, a terminal T4 is a negative-side terminal of the battery cell BC3 as well as a positive-side terminal of a battery cell BC4, which is not shown in the figure. The combined battery pack 1 includes also terminals T5, T6, T7 and T8, which are not shown in the figure, as terminals similar to the terminals T2, T3 and T4. Lastly, in the case of a cell group including eight battery cells BC1 to BC8, a terminal T9 not shown in the figure is a negative-side terminal of the battery cell BC8.

An equalization circuit unit 3 is provided for executing electric discharging control to make the voltages of the battery cells BC1, BC2 and so on uniform and equal to the lowest voltage among the battery cells BC1, BC2 and so on, when an IG switch (including a main power supply switch) of the vehicle is turned off. The IG switch is put in a turned-off state during a period (for example, at night) when the vehicle is not driven. By execution of the electric discharging control, dispersions in state of charge (SOC) among the battery cells BC1, BC2 and so on can be eliminated.

The equalization circuit unit 3 comprises a reference voltage generation circuit 2, a comparator circuit 4, an electric discharging control circuit 5 and an electric discharging circuit 6. The comparator circuit 4 includes comparators CP2, CP3 and so on and a signal transfer circuit 40, However, only circuits related to the electrical discharging process of the battery cell BC2 in the equalization circuit unit 3 are shown in detail. As for the other battery cells BC1, BC3 and so on, circuits related to their electrical discharging processes are not shown except electrical discharging control circuits LG1, LG3 and so on as well as electrical discharging circuits DC1, DC3 and so on. The electrical discharging control circuits LG1, LG3 and so on as well as electrical discharging circuits DC1, DC3 and so on will be described later. The equalization circuit unit 3 is integrated in a one-chip IC along with an over-charge/over-discharge detection circuit for detecting an excessive electrically-charged condition and an excessive electrically-discharged condition, which exist when the IG switch of the vehicle is in a turned-on state.

The reference voltage generation circuit 2 includes eight resistors R1, R2, R3 and so on connected to each other to form a series circuit between the terminals T1 and T9. A reference voltage VR2 is generated at a connection node N2 between the resistors R1 and R2. Similarly, a reference voltage VR3 is generated at a connection node N3 between the resistors R2 and R3. In the same way, a reference voltage VR is generated at a connection node N between each two adjacent resistors R. Lastly, in the case of a cell group including eight battery cells BC1 to BC8, a reference voltage VR8 is generated at a connection node N8 between the resistors R7 and R8. Each of the reference voltages VR is generated at a connection node N corresponding to the reference voltage VR at an electric potential level equal to that of a voltage, which appears at the connection node N in a state in which all the battery cells BC1, BC2 and so on have uniform voltages. All the battery cells BC1, BC2 and so on have the same specifications and the resistances of all the resistors R1, R2 and so on are set to the same value.

In the comparator circuit 4, the comparator CP2 is driven to operate with a power supply voltage equal to a voltage generated by two battery cells BC1 and BC2 connected to each other in series as battery cells associated with the comparator CP2. That is, the power supply voltage is a voltage appearing between the positive-side terminal T1 of the battery cell BC1 placed on the high-potential side of the terminal T2, the voltage V2 appearing at which is to be compared with the reference voltage VR2 appearing at the connection node N2, and the negative-side terminal T3 of the battery cell BC2 placed on the low-potential side of the terminal T2.

Similarly, the comparator CP3 is driven to operate with a power supply voltage equal to a voltage generated by two battery cells BC2 and BC3 connected to each other in series as battery cells associated with the comparator CP3. In this case, the power supply voltage is a voltage appearing between the positive-side terminal T2 of the battery cell BC2 placed on the high-potential side of the terminal T3, the voltage V3 appearing at which is to be compared with the reference voltage VR3 appearing at the connection node N3, and the negative-side terminal T4 of the battery cell BC3 placed on the low-potential side of the terminal T3. The output portion of the comparator CP2 includes a transistor Q41 of the open-collector type. The output portion of the comparator CP3 includes a transistor Q42 of the open-collector type.

In the case of a cell group including eight battery cells BC1 to BC8, the electric discharging circuit 6 comprises an electric discharging circuit DC1 connected between the terminals of the battery cell BC1, an electric discharging circuit DC2 connected between the terminals of the battery cell BC2 - - - and an electric discharging circuit DC8 connected between the terminals of the battery cell BC8. The electric discharging control circuit 5 includes electric discharging control circuits LG1, LG2 and so on to output an electric discharging control signal to the electric discharging circuit 6 based on signals supplied by the comparators CP2 and CP3 to the electric discharging control circuit 5 by way of the signal transfer circuit 40.

A specific portion included in the signal transfer circuit 40 as a portion associated with the electric discharging control of the battery cell BC2 is a circuit for transferring signals output by the comparators CP2 and CP3 to the electric discharging control circuit LG2. The ground electric potentials of the comparator CP2 and the electric discharging control circuit LG2 are both the voltage V3 appearing at the terminal T3 but the ground electric potential of the comparator CP3 is the voltage V4 appearing at the terminal T4. Thus, the level of the signal output by the comparator CP3 needs be shifted before being transferred to the electric discharging control circuit LG2. It is to be noted that, in the specific portion included the signal transfer circuit 40 as a portion associated with the electric discharging control of the battery cell BC2, the battery cell BC2 corresponds to the first battery cell while the battery cell BC3 corresponds to the second battery cell.

The emitter of the output transistor Q41 employed in the comparator CP2 is connected to the terminal T3 serving as the ground. On the other hand, the collector of the output transistor Q41 is connected to the terminal T1 through a constant current circuit 47. A resistor R41 and a transistor Q43 are connected to each other to form a series circuit between the terminals T2 and T3. Specifically, the collector of the transistor Q43 is connected to the terminal T2 through the resistor R41 while the emitter of the transistor Q43 is connected to the terminal T3. A resistor R42 is connected between the base and emitter of the transistor Q43. The collector of the transistor Q41 is connected to the base of the transistor Q43. A signal generated by the comparator CP2 is output from the collector of the transistor Q41 as a signal to be transferred to the electric discharging control circuit LG2 by way of the signal transfer circuit 40.

On the other hand, the emitter of the output transistor Q42 (corresponding to a first transistor) employed in the comparator CP3 is connected to the terminal T4 (corresponding to the negative-side terminal of the second battery cell) serving as the ground. On the other hand, the collector of the output transistor Q42 is connected to the terminal T2 (corresponding to the positive-side terminal of the first battery cell) through a constant current circuit 48. A resistor R43 (corresponding to a load circuit) and a transistor Q44 (corresponding to a second transistor) are connected to each other to form a series circuit between the terminal T2 and the terminal T3 (corresponding to a common connection point between the first and second battery cells). Specifically, the collector of the transistor Q44 is connected to the terminal T2 through the resistor R43 while the emitter of the transistor Q44 is connected to the terminal T3. A resistor R44 is connected between the base and emitter of the transistor Q44. The collector of the transistor Q42 is connected to the base of the transistor Q44 through a diode D41 for preventing a current from flowing in reverse. A signal generated by the comparator CP3 is output from the collector of the transistor Q42 as a signal to be transferred to the electric discharging control circuit LG2 by way of the signal transfer circuit 40.

In operation, it is noted that the output transistor Q41 of the comparator Q41 operates as a part of the signal transfer circuit 40. While the combined battery pack 1 is in use, the combined battery pack 1 carries out electric charging and discharging operations repeatedly. As the electric charging and discharging operations are carried out repeatedly, the SOC (state of charge) of the battery cells BC1, BC2 and so on disperse due to, among others, variations in storage capacity and variations in self electric discharging characteristic. As a result, the voltages generated by the battery cells BC1, BC2 and so on become no longer uniform. With the IG switch of the vehicle put in a turned-off state, however, the equalization circuit unit 3 carries out an equalization process to make the voltages generated by the battery cells uniform as follows.

The comparator CP2 compares the voltage V2 with the reference voltage VR2. When a relation of V2<VR2 holds true, the transistor Q41 is turned off, causing a current to flow from the constant current circuit 47 employed in the signal transfer circuit 40 to the resistor R42. Thus, the transistor Q43 is turned on. As a result, a signal output from the transistor Q43 to the electric discharging control circuit LG2 is set at the L level. When a relation of V2>VR2 holds true, on the other hand, the transistor Q41 is turned on, causing no current to flow from the constant current circuit 47 to the resistor R42. Thus, the transistor Q43 is turned off. As a result, a signal output from the transistor Q43 to the electric discharging control circuit LG2 is raised to the H level.

The comparator CP3 compares the voltage V3 with the reference voltage VR3. When a relation of V3<VR3 holds true, the transistor Q42 is turned off, causing a current to flow from the constant current circuit 48 employed in the signal transfer circuit 40 to the resistor R44 by way of the diode D41. Thus, the transistor Q4 is turned on. As a result, a signal output from the collector of the transistor Q4 to the electric discharging control circuit LG2 is set at the L level.

When a relation of V3>VR3 holds true, on the other hand, the transistor Q42 is turned on, causing a current to flow from the constant current circuit 48 to the terminal T4 by way of the transistor Q42. At that time, the electric potential appearing at the collector of the transistor Q42 decreases to a level close to the voltage V4 appearing at the terminal T4. Since the diode D41 for preventing a current from flowing in reverse is connected between the collector of the transistor Q42 and the base of the transistor Q4, however, a difference between the voltage V3 appearing at the terminal T3 and the voltage V4 appearing at the terminal T4 is applied to the diode D41 but not applied only between the base and emitter of the transistor Q44. Thus, a Zener breakdown phenomenon can be prevented from occurring at a junction between the base and emitter of the transistor Q44. In this state, the transistor Q44 is turned off since the difference between the voltage V3 appearing at the terminal T3 and the voltage V4 appearing at the terminal T4 is applied between the base and emitter of the transistor Q44 in reverse. As a result, a signal output from the collector of the transistor Q44 to the electric discharging control circuit LG2 is raised to the H level.

When the signal transferred from the comparator CP2 to the electric discharging control circuit LG2 by way of the signal transfer circuit 40 is raised to the H level and the signal transferred from the comparator CP3 to the electric discharging control circuit LG2 by way of the signal transfer circuit 40 is set at the L level, the electric discharging control circuit LG2 outputs an electric discharging control signal to the electric discharging circuit DC2 as a request for an activation of an electric discharging operation. Otherwise, the electric discharging control circuit LG2 outputs an electric discharging control signal to the electric discharging circuit DC2 as a request for a termination of an electric discharging operation.

Control of the electric discharging circuits DC3, DC4 and so on associated with the battery cells BC3, BC4 and so on respectively is executed in the same way as the control of the electric discharging circuit DC2 associated with the battery cell BC2. On the other hand, control of the electric discharging circuit DC1 associated with the battery cell BC1 is executed based on the signal output by the comparator CP2.

As described above, in the equalization circuit unit 3 employed in the combined battery pack 1, to transfer signals output by the comparators CP2, CP3 and so on to the electric discharging control circuit 5, the signal transfer circuit 40 having a level-shifting function is required. In the signal transfer circuit 40 in this embodiment, a current consumed by the signal transfer circuit 40 is all but constant even when a cell voltage appearing between the positive-side terminal of the battery cell BC2 and the negative-side terminal of the battery cell BC3 changes or even when the output transistor Q42 employed in the comparator CP3 is turned on and off. When the resistances of the resistors R41 and R43 are large, the current consumed by the signal transfer circuit 40 is approximately equal to the sum of currents generated by the constant current circuits 7 and 8. In addition, since the current consumed by the signal transfer circuit 40 needs be just enough for carrying out the operation to propagate the signals output by the comparators CP2, CP3 and so on, the magnitude of the consumed current can be reduced to a very small value.

Since the current consumed by the signal transfer circuit 40 is originally generated by the combined battery pack 1, by making the magnitude of the consumed current extremely small and constant, the magnitudes of currents flowing to the battery cells BC1, BC2, BC3 and so on, that is, the magnitudes of electrical discharging currents of the battery cells BC1, BC2, BC3 and so on, can also be made very small. In addition, causes making non-uniformity among battery-cell currents can be eliminated. Thus, an electrical discharging process from a battery cell having a low cell voltage can be suppressed and it is therefore possible to avoid generation of non-uniform electrical discharging currents, which obstruct the electrical discharging control executed by the equalization circuit unit 3, to make the voltages generated by the battery cells uniform.

The power supply voltage fed to the comparator CP3 is supplied from the terminals of the two battery cells BC3 and BC4 connected in series to sandwich the terminal T3 located between the battery cells BC3 and BC4 as a common connection point, the voltage V3 appearing at which is to be compared with the reference voltage VR3. Thus, the comparator CP3 is capable of carrying out the comparison operation normally without regard to whether the voltage V3 appearing at the terminal T3 is higher or lower than the reference voltage VR3. The power supply voltage fed to the comparator CP2 is supplied in the same way as the comparator CP3.

In the second embodiment, the first transistor employed as a part of the signal transfer circuit 40 is not limited to the output transistor Q42 of the comparator CP3. In addition, the signal transferred by the signal transfer circuit 40 is not limited to a signal output by a comparator.

The comparator CP3 is driven to operate with a power supply voltage equal to a voltage generated by two or more battery cells connected to each other in series as battery cells associated with the comparator CP3. That is, the power supply voltage is a voltage appearing between the positive-side terminal T of any battery cell BC placed on the high-potential side of the terminal T3, the voltage V3 appearing at which is to be compared with the reference voltage VR3 appearing at the connection node N3, and the negative-side terminal T of any battery cell BC placed on the low-potential side of the terminal T3. For example, the power supply voltage is a voltage appearing between the positive-side terminal T1 of the battery cell BC1 placed on the high-potential side of the terminal T3 and the negative-side terminal T5 of the battery cell BC4 placed on the low-potential side of the terminal T3. It is to be noted that the negative-side terminal T5 and the battery cell BC4 are not shown in the figure.

The signal transfer circuit 40 of the second embodiment may be used in the first embodiment.

In addition, in both embodiments, the combined battery pack 1 is not limited to the lithium-ion batteries. That is, the combined battery pack 1 can comprise other secondary batteries such as lead batteries or nickel-hydrogen batteries.

What is claimed is:

1. A cell voltage equalization apparatus for a combined battery pack that includes cells of a plurality of secondary batteries connected to each other in series, the apparatus comprising:
    a plurality of electric discharging circuits, each being connected between terminals of each of the cells;
    a reference voltage generation circuit including resistors connected in series to each other to form a series circuit between a pair of terminals of the combined battery pack, each resistor generating a reference voltage equal to a voltage, which appears at a common connection point between every two adjacent ones of the cells when voltages of all the cells are made uniform;
    a plurality of comparison circuits, each being driven with a voltage of a power supply connected between a positive-side terminal of a specific one of the cells and a negative-side terminal of a particular one of the cells to compare a voltage appearing at a common connection point between every two adjacent ones of the cells with the reference voltage corresponding to the common connection point where the specific and particular cells are adjacent to each other and are located on a higher-potential side and a lower-potential side, respectively, of each of the common connection points; and
    a plurality of electric discharging control circuits, each being for controlling an electric discharging operation carried out by the electric discharging circuit in accordance with a signal output by the comparison circuit to make voltages of the cells uniform,
    wherein the terminals of the pair of terminals of the combined battery pack are a highest potential terminal and a lowest potential terminal of the combined battery pack, of the specific cell, with a specific reference voltage generated by the reference voltage generation circuit corresponding to the specific common connection point;
    receiving a signal from the comparison circuit for comparing a voltage appearing at a particular one of the common connection points, which is connected to the negative-side terminal of the specific cell, with a particular reference voltage generated by the reference voltage generation circuit as the reference voltage corresponding to the particular common connection point; and
    driving the electric discharging circuit, based on the signals received from the comparison circuits, to carry out an electric discharging operation, when the voltage appearing at the specific common connection point connected to the positive-side terminal of the specific cell is higher than the specific reference voltage and the voltage appearing at the particular common connection point connected to the negative-side terminal of the specific cell is equal to or lower than the particular reference voltage, and when the voltage appearing at the specific common connection point connected to the positive-side terminal of the specific cell is equal to the specific reference voltage and the voltage appearing at the particular common connection point connected to the negative-side terminal of the specific cell is lower than the particular reference voltage.

2. The cell voltage equalization apparatus according to claim 1, wherein the comparison circuit includes:
    a differential input transistor;
    a load circuit connected between the collector of the differential input transistor and a supply line of a power supply; and
    a diode connected between the collector of the differential input transistor and the load circuit to serve as a diode for preventing a current from flowing in a reversed direction, 3. The cell voltage equalization apparatus according to claim 2, wherein the comparison circuit further includes a base current compensation circuit for supplying a current to the base of the differential input transistor.

4. The cell voltage equalization apparatus according to claim 1, wherein the electric discharging control circuit controls the electric discharging circuit connected between terminals of any specific one of the cells, which compose the combined battery pack, by: receiving a signal from the comparison circuit for comparing a voltage appearing at a specific one of the common connection points, which is connected to the positive-side terminal of the specific cell, with a specific reference voltage generated by the reference voltage generation circuit corresponding to the specific common connection point;
    receiving a signal from the comparison circuit for comparing a voltage appearing at a particular one of the common connection points, which is connected to the negative-side terminal of the specific cell, with a particular reference voltage generated by the reference voltage generation circuit as the reference voltage corresponding to the particular common connection point; and
    driving the electric discharging circuit, based on the signals received from the comparison circuits, to carry out an electric discharging operation, when the voltage appearing at the specific common connection point connected to the positive-side terminal of the specific cell is higher than the specific reference voltage and the voltage appearing at the particular common connection point connected to the negative-side terminal of the specific cell is equal to or lower than the particular reference voltage, and when the voltage appearing at the specific common connection point connected to the positive-side terminal of the specific cell is equal to the specific reference voltage and the voltage appearing at the particular common connection point connected to the negative-side terminal of the specific cell is lower than the particular reference voltage.

5. The cell voltage equalization apparatus according to claim 1, wherein an equal number of the plurality of electric discharging circuits, the resistors of the reference voltage generation circuit, and the electric discharging control circuits are included in the cell voltage equalization apparatus.

6. A cell voltage equalization apparatus for a combined battery pack that includes cells of a plurality of secondary batteries connected to each other in series, the apparatus comprising:
    an electric discharging circuit connected between terminals of each of the cells;
    a pair of terminals for the combined battery pack, wherein the terminals of the pair of terminals of the combined battery pack are a highest potential terminal and a lowest potential terminal of the combined battery pack;

a reference voltage generation circuit for generating a reference voltage equal to a voltage, which appears at a common connection point between every two adjacent ones of the cells, when voltages of all the cells are made uniform, wherein the reference voltage circuit is a series circuit connected between the terminals of the pair of terminals;

a comparison circuit driven with a voltage of a power supply connected between a positive-side terminal of a first cell and a negative-side terminal of a second cell to compare a voltage appearing at a common connection point between the first cell and the second cell with the reference voltage corresponding to the common connection point where the first and the second cells are adjacent to one another and are located on a higher-potential side and a lower-potential side, respectively, of each of the common connection points; and an electric discharging control circuit for controlling electric discharging operations carried out by the electric discharging circuit in accordance with a signal output by the comparison circuit to make voltages of the cells uniform, wherein the comparison circuit includes:

a constant current circuit and a first transistor, which are connected to each other to form a series circuit between the positive-side terminal of the first cell and the negative-side terminal of the second cell as a cell connected to a side of an electrical potential lower than that of first cell;

a load circuit and a second transistor, which are connected to each other to form a series circuit between the positive-side terminal of the first cell and an inter-cell connection point located between the positive-side terminal of the first cell and the negative-side terminal of the second cell in the combined battery pack;

a diode connected between the collector of the first transistor and a base of the second transistor for preventing a current from flowing in reverse; and a resistor connected between the base and an emitter of the second transistor, the second transistor being constructed to produce at a collector thereof an output signal applied to the discharge control circuit according to an input signal supplied to a base of the first transistor.

7. The cell voltage equalization apparatus according to claim 6, wherein:

the first transistor is an output transistor of a comparator which is driven with the power supply connected between the positive-side terminal of the first cell and the negative-side terminal of the second cell to carry out an operation of comparing a voltage appearing at the inter-cell connection point with the predetermined reference voltage.

8. A cell voltage equalization apparatus comprising:

a plurality of battery cells connected to each other in series to thereby form a combined battery pack, each of the plurality of battery cells including a positive-side terminal and a negative-side terminal;

a plurality of electric discharging circuits respectively connected between positive-side and negative-side terminals of the plurality of battery cells;

a reference voltage generation circuit including a plurality of resistors connected in series to each other to form a series circuit between a positive-side terminal of a first of the plurality of battery cells and a negative-side terminal of another of the plurality of battery cells, and to generate reference voltages equal to voltages appearing at common connection points between every two adjacent ones of the resistors;

a plurality of comparison circuits for comparing voltages appearing at common connection points between every two adjacent ones of the battery cells with respective reference voltages at the points between every two adjacent ones of the resistors, wherein each of the plurality of comparison circuits is driven with a voltage of a positive-side terminal of one of the battery cells and a negative-side terminal of a different one of the battery cells; and a plurality of electric discharging control circuits, each being for controlling an electric discharging operation carried out by the electric discharging circuit in accordance with a signal output by the comparison circuit to make voltages of the cells uniform, wherein the first and the another of the plurality of battery cells are provided at a highest potential side and a lowest potential side of the combined battery pack, and wherein the one and the different one of the battery cells are connected adjacently to each other at a higher potential side and a lower potential side of the common connection point, respectively.

9. The cell voltage equalization apparatus according to claim 8, wherein each comparison circuit includes:

a differential input transistor;

a load circuit connected between the collector of the differential input transistor and a supply line of a power supply; and a diode connected between the collector of the differential input transistor and the load circuit to serve as a diode for preventing a current from flowing in a reversed direction.

10. The cell voltage equalization apparatus according to claim 8, wherein each comparison circuit further includes a base current compensation circuit for supplying a current to the base of the differential input transistor.

11. The cell voltage equalization apparatus according to claim 8, wherein each electric discharging control circuit controls the electric discharging circuit connected between terminals of one of the cells that compose the combined battery pack, by:

receiving a signal from the comparison circuit for comparing a voltage appearing at a specific one of the common connection points, which is connected to the positive-side terminal of the specific cell, with a specific reference voltage generated by the reference voltage generation circuit corresponding to the specific common connection point;

receiving a signal from the comparison circuit for comparing a voltage appearing at a particular one of the common connection points, which is connected to the negative-side terminal of the specific cell, with a particular reference voltage generated by the reference voltage generation circuit as the reference voltage corresponding to the particular common connection point; and driving the electric discharging circuit, based on the signals received front the comparison circuits, to carry out an electric discharging operation, when the voltage appearing at the specific common connection point connected to the positive-side terminal of the specific cell is higher than the specific reference voltage and the voltage appearing at the particular common connection point connected to the negative-side terminal of the specific cell is equal to or lower than the particular reference voltage, and when the voltage appearing at the specific common connection point connected to the positive-side terminal of the specific cell is equal to the specific reference voltage and the voltage appearing at the particular common connection point connected to the negative-side terminal of the specific cell is lower than the particular reference voltage.

* * * * *